US006340494B1

(12) United States Patent
Klukowski et al.

(10) Patent No.: US 6,340,494 B1
(45) Date of Patent: Jan. 22, 2002

(54) DRY PRODUCT WHICH CAN BE RECONSTITUTED WITH HOT AQUEOUS LIQUIDS AND PROCESS FOR ITS PRODUCTION

(75) Inventors: Horst Klukowski, Neuenstadt-Kocherturn; Rolf Stute, Remseck; Gerhard Speth, Heilbronn, all of (DE)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/567,170

(22) Filed: May 8, 2000

(51) Int. Cl.$^7$ .................. A23L 1/0522; A23L 1/212
(52) U.S. Cl. .................. 426/640; 426/465; 426/578; 426/615
(58) Field of Search .................. 426/615, 578, 426/640, 465

(56) References Cited

U.S. PATENT DOCUMENTS

| | | | |
|---|---|---|---|
| 3,054,676 A | * | 9/1962 | Lauhoff et al. ............. 426/453 |
| 3,443,964 A | | 5/1969 | Marotta et al. |
| 3,579,341 A | | 5/1971 | Trubiano et al. |
| 3,650,770 A | | 3/1972 | Marotta et al. |
| 3,998,977 A | | 12/1976 | Rabeler |
| 5,130,156 A | * | 7/1992 | Bergquist et al. ........... 426/453 |

FOREIGN PATENT DOCUMENTS

| DE | 2938596 | 1/1988 |
|---|---|---|
| DE | 3506513 | 3/1989 |

OTHER PUBLICATIONS

Meyer, L. Food Chemistry, 1978, Avi Publishing Co., Inc. Westport, Connecticut, p. 77.*

* cited by examiner

*Primary Examiner*—Helen Pratt
(74) *Attorney, Agent, or Firm*—Norris, McLaughlin & Marcus

(57) ABSTRACT

Dried products of external-starch-containing fruit or vegetable concentrates are prepared wherein the products can be reconstituted with hot or cold aqueous liquids to form fruit pulps or vegetable pulps. The dried products are made by roller drying of external-starch-containing fruit and/or vegetable concentrates and comminuting to make flakes. The flakes are agglomerated with fruit concentrates or vegetable concentrates to make an agglomerate. The agglomerate is steamed and simultaneously heat treated or, alternatively, gently dried and then heat treated, to the desired final water content.

16 Claims, No Drawings

DRY PRODUCT WHICH CAN BE RECONSTITUTED WITH HOT AQUEOUS LIQUIDS AND PROCESS FOR ITS PRODUCTION

BACKGROUND OF THE INVENTION

1. Field of the Invention

The invention relates to flake agglomerates having a pulpy texture after reconstitution. It relates in particular to a process for producing dry products which can be reconstituted using cold and hot aqueous liquids to form fruit pulps and vegetable pulps.

2. The Related Art

Roller drying of starches and of vegetable purees or fruit purees is a drying technology which has long been known. The starch pastes etc. are applied in a thin layer to a hot, slowly rotating roller. The film which is produced in this manner, and which is dry at the end, is taken off from-the roller shortly upstream of the application point of the wet products and comminuted to form flakes. The resultant flakes are not only dry, and thus have improved keeping quality in comparison with the water-containing, generally readily spoilable starting products, but the thermal cooking on the hot roller has, for example, also caused gelatinization of the starches. Products produced by roller drying therefore swell in aqueous liquids, or are sometimes even soluble therein (the term "swelling starches" for cold-swelling starches results from the application of this technology).

Typical of roller-dried products is the flake shape resulting from the film comminution, which flake shape can still be recognized under the microscope, even with very intense comminution. Flakes can have any size in the two directions given by the film plane, dependent solely on the degree of comminution. In contrast, the expansion into the third dimension is clearly predetermined by the film thickness possible on the roller and is generally between 0.3 and 0.7 mm, the latter value already generally requiring double application.

Owing to this characteristic flake shape, roller products are differentiated from other drying processes in which there is no limitation with respect to the third dimension. Generally, for example in air-circulation drying and freeze-drying, at least in principle, products expanded as desired in all dimensions can be obtained. Even spray-drying gives a spherical product expanded equally in all three dimensions, although only very small particles are obtained.

Therefore, there has been no lack of attempts to give flake products a third dimension. Thus, owing to the poorer heat transfer in the case of thicker films and thus insufficient drying on the one side, and overdrying or even burning, owing to the sensitivity of many foods to high temperatures, on the side lying on the roller, this has not been achieved to date using roller drying.

In the case of high-sugar products, such as fruit pulps, the hot film, which is plastic on account of the high sugar content, can be pushed together by suitable apparatuses during takeoff from the roller and in this manner a product about 2–3 mm thick is obtained after solidification due to folding into the third dimension. As regards the structure and appearance, products of this type are more comparable with foam-dried products than with flakes.

Furthermore, this is a process which changes the appearance, but not the physical properties, i.e. the solubility, swellability, etc.

However, there is now a need not only to change the development of the flakes in the direction of a third dimension, but simultaneously their physical properties. This is because flake products, on account of their small thickness, not only have a low mechanical stability which leads, for example, to their readily disintegrating in mixing processes. Also, in aqueous liquids, flakes generally rapidly dissolve, i.e. the particles stuck to one another in the film during drying disintegrate rapidly, which, in the case of mashed potato products, which are likewise produced by roller drying, is an advantage, since then the individual potato cells which are typical of mashed potato having good consistency (non-sticky) are obtained.

In many products, in contrast, such a disintegration of the flakes is not wanted, but what is termed a pulpy structure is sought.

These are to be present not only after rehydration in cold liquids, but, in particular, also after rehydration in hot liquids.

The production of such products having a pulpy structure after rehydration in hot aqueous liquids is described in Patents DE 29 38 596 and DE 35 06 513. 20 According to the process of DE 29 38 596, the fruit or vegetable portion is mixed with starch and, if appropriate, other additives and before, during or after the mixing is converted at least in part in a manner known per se by gelatinization, freezing, drying and, if appropriate, comminution, into a starch sponge having a grain size of from 125 um to 2 cm.

In the process of DE 35 06 513, the fruit or vegetable portion is likewise mixed with external starch and, if appropriate, other additives, as external starch use being made at least in part of legume starch which before, during or after the mixing is converted at least in part by gelatinization under mild conditions and drying and also, if appropriate, comminution, into a dry product having a particle size of from 0.1 to 10 mm. In this process, the reconstitution properties can be further improved by what is termed conditioning, i.e. a heat-moisture treatment after the drying. This conditioning, when roller drying is employed, advantageously immediately follows the actual roller-drying process.

In both processes, in particular, dry tomato products are produced which have not only a pulpy structure, but also a certain cooking stability.

The starch sponge obtained by the process of DE 29 38 596 can, on account of its high porosity, readily be dried. The properties to be demanded of such a product, that is to say sufficient expansion in all three dimensions, are ensured during the freeze-drying or air-circulation drying by the greater layer thickness possible in this process. The improved stability after hydration results from the starch retrogradation achieved during freezing and rethawing. Retrograded starch disintegrates less readily in hot liquids, but is also of only limited cooking stability.

In the process of DE 35 06 513, the required pulpy texture is achieved by the use of a special starch, that is to say pea starch, which owing to its higher amylose content, under suitable conditions, retrogrades more intensively as soon as it is on the roller, so that a flake is obtained which likewise does not disintegrate in hot liquids and has the desired pulpiness. However, still missing from this flake is the expansion into the third dimension, which would denote a still more enhanced pulpiness.

The essential advantage of the process described in DE 35 06 513 is the production costs which are about 50% lower by using the roller drying instead of the sponge technique. The flake production using roller drying is an at most 2-stage process (drying, flocculation), whereas, when the sponge technique is used, 4–5 process steps are necessary (freezing, conditioning, thawing, water removal, drying, comminution).

A proven process, which is employed especially in the case of fine powders, for increasing particle sizes, in particular in all three dimensions, is the agglomeration process, which, in the case of flake products, in view of the generally low mechanical stability can be used with more difficulty, but may always be used. Although an agglomeration of this type fundamentally represents a further process step, it does not denote following directly the flocculation, i.e. the comminution of the film which is necessary in any case, any significant complication of the process. The Comparison Example 1 below shows that very attractive particles, which are expanded in all 3 dimensions, of a light, coarsely porous structure are obtained in this way. Unfortunately, these particles disintegrate, which is also generally sought after in the case of agglomerated products in the context of good dispersibility, very rapidly, more precisely as soon as they are in cold aqueous liquids (the cooking residue is correspondingly low, 68–75 g).

U.S. Pat. Nos. 3,443,964, 3,579,341 and 3,650,770 describe the production of food products having a pulpy texture by admixing gelatinized amylose-containing starch products. These patents, which disclose processes differing from the process according to the invention, demonstrate, however, the need for such pulpy products and there continues, to be a need even now for products to, be produced, especially inexpensively, which give a pulpy structure even after rehydration in hot liquids.

Surprisingly, it has been found that the known less costly roller-drying process may be modified and a very good cooking stability and thus pulpiness can be achieved if the flakes obtained after the roller drying are agglomerated and the agglomerate is subjected to a heat-moisture treatment.

SUMMARY OF THE INVENTION

The invention thus relates to a process for producing dry products which can be reconstituted with cold and hot aqueous liquids to form fruit pulps and vegetable pulps by roller drying of external-starch-containing fruit concentrates and vegetable concentrates, which is characterized in that the flakes obtained by comminution after the roller drying are agglomerated using fruit concentrates and vegetable concentrates and the resulting agglomerate is subjected to a heat-moisture treatment and simultaneously or subsequently dried to the desired final water content.

Advantageously, for the agglomeration, use is made of the same starch-containing formulation as is used to produce the flakes, an absolutely homogeneously constituted product being obtained which, after rehydration in hot aqueous liquids, has an excellent pulpiness.

DESCRIPTION OF THE PREFERRED EMBODIMENTS

Preferably, as external starch, use is made of a starch of the B type. Preferred starches of the B type are, for example, potato starch and canna starch. Preferably, use is made of potato starch.

If use is made of one of these preferred starches, the agglomeration can be effected, instead of with the starch-vegetable concentrate mixture, alternatively by spraying water or an aqueous starch suspension.

Whereas the known process of DE 35 06 513 demands the use of pea starch, in accordance with the process according to the invention, other starch varieties can also be used, in particular the cheap potato starch.

Preferably, the heat-moisture treatment according to the invention is carried out during the post-drying.

An expedient heat-moisture treatment can be carried out at 65–95° C., preferably 70–90° C., in the course of from 20 minutes to 12 hours, preferably from 30 minutes to 4 hours.

The moisture required for the heat-moisture treatment can be introduced with the water in the fruit concentrate or vegetable concentrate used for the agglomeration or, when a B starch is used, by spraying water or an aqueous starch suspension.

Finally, the product can be dried to a residual moisture content of 3–8% by weight, preferably 4–6% by weight.

The amount of starch used can be varied according to the formulas employed. Generally, an amount of 10–60% by weight of external starch is used.

Preferably, the vegetable portion consists of tomatoes.

By means of the process according to the invention, therefore, a dry product which can be reconstituted with cold and hot aqueous liquids to form fruit pulps or vegetable pulps, preferably tomato pulps, is obtained from external-starch-containing fruit concentrates or vegetable concentrates, preferably tomato concentrates, which is characterized in that at least some of the external starch is a B starch which has been subjected to a heat-moisture treatment.

The dry product according to the invention comprises flakes of good mechanical stability even after rehydration in hot liquids, i.e. a reconstituted product of good pulpiness is obtained.

In the examples below, the cooking residue is determined as follows:

Determination of the Cooking Residue:

15 g of flakes are added to 500 ml of cold water and, after heating to boiling temperature, are cooked at low heat for 2 min. The cooking residue is then determined by reweighing after pouring off through a 0.5 mm screen and a dripping time of 1 min.

The invention is described by the examples below, in which all percentages are per cent by weight:

EXAMPLE 1

A mixture of 430 kg of tomato concentrate (38° Brix), 225 kg of pea starch, 6 kg of anhydrous citric acid and 380 ml of water is roller-dried in the manner customary for the production of tomato flakes having a pulpy texture after rehydration in hot liquids. After the flocculation and screening to a particle size distribution of from about 4 to 10 mm, agglomeration is carried out in the Glatt agglomerator (alternatively in the Seydelman cutter) by spraying about 25% (based on flake dry matter) of the above mixture (a suspension). The resultant agglomerate is steamed and simultaneously heat-treated by an appropriately arranged drying (45 min at 80° C.); alternatively, the agglomerate can also be gently dried, as in Example 2, and then heat treated, a final water content of 4–6% being achieved. The resultant product is distinguished by an intensively red homogeneous colour and has good cooking stability (cooking residue>120 g).

COMPARISON EXAMPLE 1.a

Tomato flakes are produced in a similar manner to Example 1, agglomerated, gently dried, but not heat treated. The resulting product is comparable with respect to colour intensity and homogeneity with the product from Example 1, but has a markedly lower pulpiness (cooking residue 68–75 g).

EXAMPLE 2

A mixture of 42 kg of tomato concentrate, 38° Brix, 20 kg of potato starch having 20% moisture is roller-dried, with substantial avoidance of retrogradation on the roller. After flocculation and screening according to Example 1, the resultant product has a cooking residue of less than 45 g. By spraying on 30% (based on flake dry matter) of a 3% potato starch paste, an agglomerate is obtained in the Glatt agglomerator which, similarly to Example 1, is first gently dried to a water content of 12% and is then heat-treated at 90° C. for 30 min.

The resultant product has, after rehydration, a pulpy texture, but in comparison to Example 1 has, in the dry state, a somewhat less uniform colour, but after rehydration is scarcely to be differentiated from the product from Example 1. The cooking residue is >120 g.

EXAMPLE 3

Similarly to Example 2, flakes are produced having a cooking residue <45 g and after corresponding flocculation and screening are agglomerated to a particle size of 2–4 mm by spraying on 25% water. After gentle drying to 10–12%, moisture, the agglomerate is heat-treated at 80° C. for 45 min.

In this manner also, a homogeneous product having good colour intensity and good mechanical stability of the flakes and good cooking stability is obtained (cooking residue 110–120 g).

What is claimed is:

1. Process for producing dry products which can be reconstituted with cold and hot aqueous liquids to form fruit pulps and vegetable pulps by roller drying of fruit concentrates and vegetable concentrates containing external starch, wherein flakes obtained by comminution after the roller drying are agglomerated using the fruit concentrates and vegetable concentrates and the resulting agglomerate is subjected to a heat-moisture treatment and simultaneously dried to the desired final water content.

2. Process according to claim 1, wherein the external starch is potato starch.

3. Process according to claim 1 wherein the heat-moisture treatment is carried out at 65–95° C., in the course of from 20 minutes to 12 hours.

4. The process of claim 3 wherein the heat-moisture treatment is carried out at 70–90° C. for from 30 minutes to 4 hours.

5. Process according to claim 1 wherein for the agglomeration, use is made of the same aqueous fruit concentrate or vegetable concentrate containing external starch which was used for the roller drying to introduce the moisture required for the heat-moisture treatment.

6. Process according to claim 1 wherein the product is dried to a residual moisture content of 3–8%.

7. The process of claim 6 wherein the product is dried to a residual moisture content of 4–6%.

8. Process according to claim 1 wherein use is made of 10–60% by weight of external starch.

9. The process according to claim 1 wherein the external starch is potato or canna starch and the flakes obtained after the roller drying are agglomerated by spraying on water or an aqueous starch suspension.

10. Process according to claim 1, wherein the external starch is canna starch.

11. Dry product which can be reconstituted by cold and hot aqueous liquids to form fruit pulps or vegetable pulps comprising external starch at least some of which has been subjected to a heat-moisture treatment wherein the dry product is in the form of agglomerated flakes.

12. Dry product according to claim 11, wherein the vegetable portion consists of tomatoes.

13. The dry product of claim 11 wherein the external starch is potato starch.

14. The dry product of claim 11 wherein the external starch is canna starch.

15. The dry product of claim 11 having a moisture content of 3–8%.

16. The dry product of claim 15 having a moisture content of 4–6%.

* * * * *